May 7, 1957  R. A. ROSTAN  2,791,451
SWIVEL CONDUIT JOINT
Filed June 7, 1951
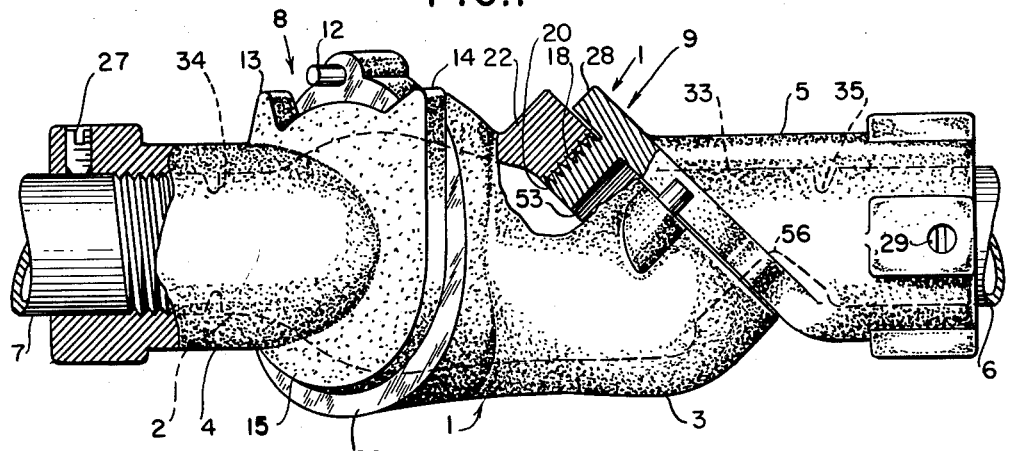
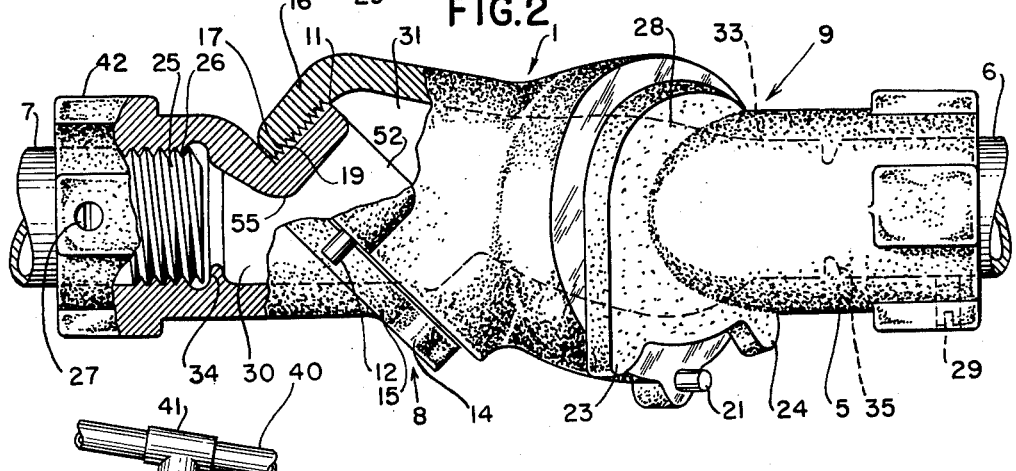
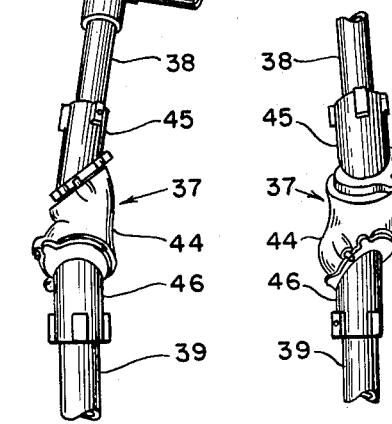
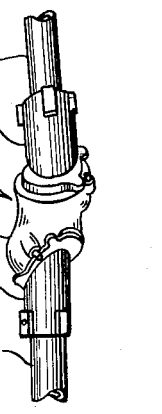
FIG.3a  FIG.3b
INVENTOR.
Robert A. Rostan
BY
ATTORNEY

2,791,451

SWIVEL CONDUIT JOINT

Robert A. Rostan, Bronx, N. Y., assignor to Russell & Stoll Company, Inc., New York, N. Y., a corporation of New York Application June 7, 1951, Serial No. 230,361

4 Claims. (Cl. 285—181)

This invention relates to explosion proof swivel joints for flexibly connecting conduit sections and in particular to flexible explosion proof swivel joints that have a universal movement.

Electric cables are carried in closed conduit systems to isolate the electric cables from explosive mixtures that may occur in the vicinity of the cable and to confine a spark or flash within the conduit for preventing it from igniting the surrounding atmosphere. In connecting sections of the conduit it is often desirable to flexibly connect sections of the conduit so that two sections may be flexed or bent in more than one direction as, for instance, in the case of suspended electrical appliances.

The object of the invention is to provide a flexible conduit joint that has a universal movement and is explosion proof.

Another object of the invention is to provide a flexible explosion proof unit that does not abrade or wear the cable passing through the joint.

Another object of the invention is to provide a flexible explosion proof joint that is inexpensive to make and durable in service.

Another object of the invention is to provide an unobstructed passage without sharp bends through a conduit joint that has a universal movement.

Another object of the invention is to provide an explosion proof universal conduit joint that has a minimum of parts and is easy to assemble on the conduit.

Other and further objects of the invention will appear from the following description taken in connection with the drawings in which—

Figs. 1 and 2 are top and side views respectively of the joint with fragmentary sections showing the internal structure; and Figs. 3a and 3b illustrate the joint in suspended positions.

The joint 1 with a cable passage 2 therethrough comprises a central member 3 flexibly interconnecting the connectors 4 and 5 by means of the couplings 8 and 9. The couplings 8 and 9 are positioned at ninety degrees to one another about a longitudinal axis through the joint so that the connectors move in planes at substantially right angles to one another. The connectors 4 and 5 are rigidly fastened to the conduit sections 6 and 7 and in turn flexibly interconnecting them so that one conduit section can readily assume any angle with respect to the other conduit within limits of movement of the couplings. An electrical cable (not shown) carried by the conduits 6 and 7 would pass through the passage 2 bending with the flexing of the joint 1.

The coupling 8 interconnecting the connector 4 and the control member 3 comprises a ring shaped male portion 11 projecting from the end of the connector at angle to its longitudinal axis. The male portion 11 has a threaded portion 19 on the outer surface thereof engaging the threads 17 of the female portion 16 on the central members. The male portion and female portion are interconnected by at least 5 overlapping threads to seal the passage 2 from the outside atmosphere and retain any spark or flash within the conduit. A flange 15 at the base of the threaded male portion 11 has spaced stops 13 and 14 engaging the pin 12 to limit the rotation of the male portion 11 and connector 4. The pin 12 is held in a support 51 of the female portion 16. The female portion has a flat outer surface 29 facing the flange 15 and normal to the axis of the coupling.

The threads 25 of the conduit section 7 are threaded into the threads 26 on the inner wall of the connector 4 and held securely in position by the set screw 27 on the wall of the connector 4. An annular ridge 34 is formed on the inner wall of the connector 4 against which the end of the conduit 7 may seat limiting the depth it extends into connector and preventing jamming or wedging of the conduit against the inner wall. Tool engaging bosses 42 are provided on the outer surface of the connector 4 at the conduit engaging end to facilitate the tightening and loosening of the joint on the conduit 7.

The connector 5 is similarly coupled by the coupling means 9 to the other end of the central member 3 and is of similar structure. The conduit 6 is threaded into the end of the connector 5 and held by a set screw 29. An annular ridge 35 similar to the ridge 34 is provided on the inner wall.

The coupling means has a male portion 20 on the connector 5 and female portion 22 on the central member 3. The male portion is cylindrical with threads 18 on the outer surface and an opening in the center through which the cable passes. The threads 18 engage the threads on the wall of the female member and rotatably attach the connector 5 to the central member 3. In both couplings at least five threads are in engagement to provide an explosion proof connection and retain any spark or flame within the conduit system. The male portion 20 has a flange 28 at its base with stops 23 and 24 extending radially from the flange and engaging the pin 21 projecting from the female portion. The stops are spaced to provide a limited arc of movement of the connector 5. The male and female portions are threaded loosely and easily turn in relation to one another. The stops prevent the coupling from unloosening and in the case of suspended conduits prevents undue swinging of the free conduit. The male member is at an angle to the longitudinal axis of the connectors. This angle is preferably equal to the angle of the coupling 8 so that the longitudinal axis of the connectors 4 and 5 will be in line and form the central axis of the joint. The couplings 8 and 9 are at ninety degrees to each other from a position in which the axes of the two couplings are in parallel planes. Thus the movement of one connection will be ninety degrees to the other, the left portion of the joints at ninety degrees to the right portion of the joint.

The passage 2 is formed by the inner walls 30, 31, 33 of the central member 3, connector 4 and the connector 5 and holes 52, 53 interconnecting the various portions. The central member 3 is wide and the passage formed by the walls 31 is wider than those of the connectors so that the angle of the holes 52, 53 can be accommodated so that there is a direct open passage from conduit 6 to conduit 7. The edge 55 is above the axis through the joint and the edge of the shoulder 35 is below the axis. The edge 56 is below and the shoulder 34 is above. The edges 55, 56 of the holes 52, 53 respectively are rounded to present a smooth surface to a cable.

In Fig. 3a the joint 37 is shown connecting the conduit sections 38, 39 suspended from the sloping overhead main conduit 40. The upper section 38 is preferably short to reduce the strain on the T joint 41. The T joint 41 rigidly connects the conduit sections 38 to the main conduit at an angle to the vertical and the conduit 39 hangs vertically at an angle to the section 38. The center member 44 turns freely between the stops on the connector 45 securely mounted on the section 38. The conduit section 39 is threaded tightly in the connector 46. The connector 46 and conduit 39 swing freely on the central member 44. Any force applied to the conduit 39 will cause it to swing away from the vertical position. This will discourage the use of the suspending conduits as a support thereby reducing the chances of an excessive strain being applied to the T joint. Electrical fixtures or the like may be suspended from a sloping conduit and still hang in the vertical plane.

Fig. 3b illustrates another position that the joint may assume in order to suspend the conduit 39 vertically. The conduit 38 is at an angle to the conduit 40 in a different direction from the positions in Fig. 3a.

The weight of the suspended fixture or other longitudinal stress is borne by the conduit and joint and not by the cable. The stress is transmitted through the threads of the couplings which are lubricated by a silicone grease providing for the easy movement of the coupling means.

The invention has been illustrated in connection with a specific embodiment thereof with the joints at similar angles on each side of the central member. The swivel movement may be unrestrained by the omission of one or both of the pins 12 and 21. The relative angular displacement of the joints around the axis of the central member may also be varied.

The resulting adjustments are universal and are attained by a simple three-part structure requiring only two threaded joints between the parts and providing a free open passage for the cable. The construction is inexpensive, easily installed and strong and durable in service.

Although a specific embodiment of the invention has been described it is understood that various modifications and changes may be made within the scope of the invention.

I claim:

1. A swivel conduit joint for electric cables and the like comprising a central tubular member having a straight through passage about its longitudinal axis, said member having threaded end portions with the axis of each of said portions substantially 45° with respect to said longitudinal axis and lying in planes substantially perpedicular to each other, said threaded portions having a portion of their inner ends substantially adjacent a central plane perpendicular to said longitudinal axis at the longitudinal center of said member and a pair of tubular end members each having conduit connecting outer end portions and a threaded central member connecting portion with the longitudinal axis of said threaded connecting portion at an angle of substantially 45° to the longitudinal axis of said outer end portion for cooperation with a respective threaded end portion of said central member to provide a universal movement between the ends of the tubular members and the inner surfaces of each of said members throughout their entire extent being spaced radially outwardly of said longitudinal axis of said central member in at least one position of adjustment of said members about their threaded connections whereby an open passage is formed from end to end of the joint for reception of straight cables or the like.

2. A swivel conduit joint as set forth in claim 1 wherein the threads of said threaded end portions are internal and said threaded central member connecting portions have external threads engaging the threads of the threaded portions of said tubular member to connect said tubular end members to said central member for rotation in both directions.

3. A swivel conduit joint as set forth in claim 1 wherein said tubular end members and said central tubular member have means for limiting the relative rotation of the tubular end members with respect to the central member.

4. A swivel conduit joint as set forth in claim 3 wherein each of said tubular end members has circumferentially spaced stops and said central member has pin means positioned adjacent to a respective end portion and between said stops of a respective end member to limit rotation of the end members.

References Cited in the file of this patent

UNITED STATES PATENTS

| | | |
|---|---|---|
| 99,459 | Morrison | Feb. 1, 1870 |
| 132,604 | Smith et al. | Oct. 29, 1872 |
| 217,997 | Cushing | July 29, 1879 |
| 521,122 | Martin | June 5, 1894 |
| 651,747 | Cederstrom | June 12, 1900 |
| 1,352,102 | Tatro | Sept. 7, 1920 |
| 1,442,371 | Tulloch | Jan. 16, 1923 |
| 2,220,216 | Cloutier | Nov. 5, 1940 |
| 2,482,558 | Scaringella | Sept. 20, 1949 |
| 2,511,308 | Trooper | June 13, 1950 |
| 2,557,507 | Lang | June 19, 1951 |
| 2,564,272 | Morton | Aug. 14, 1951 |

OTHER REFERENCES

Crane Catalogue No. 52. On page 252 is found a 45 degree street elbow and a 45° elbow. On page 255 is found a close nipple.